United States Patent
Gorrell et al.

(10) Patent No.: US 7,579,609 B2
(45) Date of Patent: Aug. 25, 2009

(54) COUPLING LIGHT OF LIGHT EMITTING RESONATOR TO WAVEGUIDE

(75) Inventors: Jonathan Gorrell, Gainesville, FL (US); Mark Davidson, Florahome, FL (US); Michael E. Maines, Gainesville, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 290 days.

(21) Appl. No.: 11/410,905

(22) Filed: Apr. 26, 2006

(65) Prior Publication Data

US 2008/0296517 A1   Dec. 4, 2008

Related U.S. Application Data

(63) Continuation-in-part of application No. 11/302,471, filed on Dec. 14, 2005, now Pat. No. 7,361,916.

(51) Int. Cl.
*H01S 3/09* (2006.01)
(52) U.S. Cl. ............... 250/493.1; 250/494.1; 250/495.1; 250/503.1; 250/504 R; 398/82; 977/932; 977/949; 977/950
(58) Field of Classification Search ............... 250/493.1, 250/494.1, 495.1, 503.1, 504 R; 398/82; 358/129, 130, 131, 132, 14, 15; 977/932, 977/949, 950
See application file for complete search history.

(56) References Cited

U.S. PATENT DOCUMENTS

| | | |
|---|---|---|
| 1,948,384 A | 2/1934 | Lawrence |
| 2,307,086 A | 1/1943 | Varian et al. |
| 2,431,396 A | 11/1947 | Hansell |
| 2,473,477 A | 6/1949 | Smith |
| 2,634,372 A | 4/1953 | Salisbury |
| 2,932,798 A | 4/1960 | Kerst et al. |
| 2,944,183 A | 7/1960 | Drexler |
| 2,966,611 A | 12/1960 | Sandstrom |
| 3,231,779 A | 1/1966 | White |
| 3,297,905 A | 1/1967 | Rockwell et al. |
| 3,315,117 A | 4/1967 | Udelson |
| 3,387,169 A | 6/1968 | Farney |
| 3,543,147 A | 11/1970 | Kovarik |
| 3,546,524 A | 12/1970 | Stark |
| 3,560,694 A | 2/1971 | White |
| 3,571,642 A | 3/1971 | Westcott |

(Continued)

FOREIGN PATENT DOCUMENTS

EP        0237559 B1    12/1991

(Continued)

OTHER PUBLICATIONS

Neo, et al ("Smith-Purcell Radiation from Ultraviolet to Infrared Using a Si-field Emitter" Vacuum Electronics Conference, 2007, IVEC '07, IEEE International May 2007).*

(Continued)

*Primary Examiner*—David A Vanore
*Assistant Examiner*—Michael Maskell
(74) *Attorney, Agent, or Firm*—Davidson Berquist Jackson & Gowdey LLP

(57) ABSTRACT

A waveguide conduit is constructed and adapted to capture the light emitted by the at least one nano-resonant structure. The nano-resonant structure emits light in response to excitation by a beam of charged particles, The source of charged particles may be an ion gun, a thermionic filament, a tungsten filament, a cathode, a field-emission cathode, a planar vacuum triode, an electron-impact ionizer, a laser ionizer, a chemical ionizer, a thermal ionizer, or an ion-impact ionizer.

23 Claims, 3 Drawing Sheets

COUPLING LIGHT OF LIGHT EMITTING RESONATOR TO WAVEGUIDE

U.S. PATENT DOCUMENTS

| | | |
|---|---|---|
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,282,436 A | 8/1981 | Kapetanakos |
| 4,298,824 A * | 11/1981 | Walsh ............................ 315/4 |
| 4,450,554 A | 5/1984 | Steensma et al. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A * | 2/1988 | Chang et al. .................... 372/2 |
| 4,740,963 A | 4/1988 | Eckley |
| 4,740,973 A | 4/1988 | Madey |
| 4,746,201 A | 5/1988 | Gould |
| 4,761,059 A | 8/1988 | Yeh et al. |
| 4,782,485 A | 11/1988 | Gollub |
| 4,789,945 A | 12/1988 | Niijima |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A * | 12/1993 | Walsh ........................ 372/74 |
| 5,268,788 A | 12/1993 | Fox et al. |
| 5,282,197 A | 1/1994 | Kreitzer |
| 5,283,819 A | 2/1994 | Glick et al. |
| 5,293,175 A | 3/1994 | Hemmie et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,504,341 A | 4/1996 | Glavish |
| 5,578,909 A | 11/1996 | Billen |
| 5,604,352 A | 2/1997 | Schuetz |
| 5,608,263 A | 3/1997 | Drayton et al. |
| 5,663,971 A | 9/1997 | Carlsten |
| 5,666,020 A | 9/1997 | Takemura |
| 5,668,368 A | 9/1997 | Sakai et al. |
| 5,705,443 A | 1/1998 | Stauf et al. |
| 5,737,458 A * | 4/1998 | Wojnarowski et al. ........ 385/15 |
| 5,744,919 A | 4/1998 | Mishin et al. |
| 5,757,009 A | 5/1998 | Walstrom |
| 5,767,013 A | 6/1998 | Park |
| 5,780,970 A | 7/1998 | Singh et al. |
| 5,790,585 A * | 8/1998 | Walsh ........................ 372/102 |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 5,972,193 A | 10/1999 | Chou et al. |
| 6,005,347 A | 12/1999 | Lee |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,117,784 A | 9/2000 | Uzoh |
| 6,139,760 A | 10/2000 | Shim et al. |
| 6,180,415 B1 | 1/2001 | Schultz et al. |
| 6,195,199 B1 | 2/2001 | Yamada |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,309,528 B1 | 10/2001 | Taylor et al. |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,580,075 B2 | 6/2003 | Kametani et al. |
| 6,603,781 B1 | 8/2003 | Stinson et al. |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,534 B2 | 10/2003 | Madey et al. |
| 6,636,653 B2 | 10/2003 | Miracky et al. |
| 6,640,023 B2 | 10/2003 | Miller et al. |
| 6,642,907 B2 | 11/2003 | Hamada et al. |
| 6,687,034 B2 | 2/2004 | Wine et al. |
| 6,700,748 B1 | 3/2004 | Cowles et al. |
| 6,724,486 B1 | 4/2004 | Shull et al. |
| 6,738,176 B2 | 5/2004 | Rabinowitz et al. |
| 6,741,781 B2 | 5/2004 | Furuyama |
| 6,782,205 B2 | 8/2004 | Trisnadi et al. |

| | | | | | | |
|---|---|---|---|---|---|---|
| 6,791,438 B2 | 9/2004 | Takahashi et al. | | 2004/0085159 A1 | 5/2004 | Kubena et al. |
| 6,800,877 B2 | 10/2004 | Victor et al. | | 2004/0092104 A1 | 5/2004 | Gunn, III et al. |
| 6,801,002 B2 | 10/2004 | Victor et al. | | 2004/0108471 A1 | 6/2004 | Luo et al. |
| 6,819,432 B2 | 11/2004 | Pepper et al. | | 2004/0108473 A1 | 6/2004 | Melnychuk et al. |
| 6,829,286 B1 | 12/2004 | Guilfoyle et al. | | 2004/0108823 A1 | 6/2004 | Amaldi et al. |
| 6,834,152 B2 | 12/2004 | Gunn et al. | | 2004/0136715 A1* | 7/2004 | Kondo ............... 398/82 |
| 6,870,438 B1 | 3/2005 | Shino et al. | | 2004/0150991 A1 | 8/2004 | Ouderkirk et al. |
| 6,871,025 B2* | 3/2005 | Maleki et al. ............. 398/183 | | 2004/0171272 A1 | 9/2004 | Jin et al. |
| 6,885,262 B2 | 4/2005 | Nishimura et al. | | 2004/0180244 A1 | 9/2004 | Tour et al. |
| 6,900,447 B2 | 5/2005 | Gerlach et al. | | 2004/0184270 A1 | 9/2004 | Halter |
| 6,909,092 B2 | 6/2005 | Nagahama | | 2004/0213375 A1 | 10/2004 | Bjorkholm et al. |
| 6,909,104 B1* | 6/2005 | Koops et al. ............ 250/493.1 | | 2004/0217297 A1 | 11/2004 | Moses et al. |
| 6,924,920 B2 | 8/2005 | Zhilkov | | 2004/0218651 A1* | 11/2004 | Iwasaki et al. ............... 372/69 |
| 6,936,981 B2 | 8/2005 | Gesley | | 2004/0231996 A1 | 11/2004 | Webb |
| 6,943,650 B2 | 9/2005 | Ramprasad et al. | | 2004/0240035 A1 | 12/2004 | Zhilkov |
| 6,944,369 B2 | 9/2005 | Deliwala | | 2004/0264867 A1* | 12/2004 | Kondo ............... 385/49 |
| 6,952,492 B2 | 10/2005 | Tanaka et al. | | 2005/0023145 A1 | 2/2005 | Cohen et al. |
| 6,953,291 B2 | 10/2005 | Liu | | 2005/0045821 A1 | 3/2005 | Noji et al. |
| 6,954,515 B2 | 10/2005 | Bjorkholm et al. | | 2005/0045832 A1 | 3/2005 | Kelly et al. |
| 6,965,284 B2 | 11/2005 | Maekawa et al. | | 2005/0054151 A1 | 3/2005 | Lowther et al. |
| 6,965,625 B2 | 11/2005 | Mross et al. | | 2005/0067286 A1 | 3/2005 | Ahn et al. |
| 6,972,439 B1 | 12/2005 | Kim et al. | | 2005/0082469 A1 | 4/2005 | Carlo |
| 6,995,406 B2 | 2/2006 | Tojo et al. | | 2005/0092929 A1* | 5/2005 | Schneiker ............... 250/396 R |
| 7,010,183 B2 | 3/2006 | Estes et al. | | 2005/0104684 A1 | 5/2005 | Wojcik |
| 7,064,500 B2 | 6/2006 | Victor et al. | | 2005/0105690 A1 | 5/2005 | Pau et al. |
| 7,068,948 B2 | 6/2006 | Wei et al. | | 2005/0145882 A1 | 7/2005 | Taylor et al. |
| 7,092,588 B2* | 8/2006 | Kondo ............... 385/14 | | 2005/0152635 A1 | 7/2005 | Paddon et al. |
| 7,092,603 B2 | 8/2006 | Glebov et al. | | 2005/0162104 A1 | 7/2005 | Victor et al. |
| 7,122,978 B2 | 10/2006 | Nakanishi et al. | | 2005/0190637 A1 | 9/2005 | Ichimura et al. |
| 7,130,102 B2 | 10/2006 | Rabinowitz | | 2005/0194258 A1 | 9/2005 | Cohen et al. |
| 7,177,515 B2 | 2/2007 | Estes et al. | | 2005/0201707 A1 | 9/2005 | Glebov et al. |
| 7,230,201 B1 | 6/2007 | Miley et al. | | 2005/0201717 A1 | 9/2005 | Matsumura et al. |
| 7,253,426 B2 | 8/2007 | Gorrell et al. | | 2005/0212503 A1 | 9/2005 | Deibele |
| 7,267,459 B2 | 9/2007 | Matheson | | 2005/0231138 A1 | 10/2005 | Nakanishi et al. |
| 7,267,461 B2 | 9/2007 | Kan et al. | | 2005/0249451 A1 | 11/2005 | Baehr-Jones et al. |
| 7,309,953 B2 | 12/2007 | Tiberi et al. | | 2005/0285541 A1 | 12/2005 | LeChevalier |
| 7,342,441 B2 | 3/2008 | Gorrell et al. | | 2006/0007730 A1 | 1/2006 | Nakamura et al. |
| 7,362,972 B2 | 4/2008 | Yavor et al. | | 2006/0018619 A1 | 1/2006 | Helffrich et al. |
| 7,375,631 B2 | 5/2008 | Moskowitz et al. | | 2006/0035173 A1 | 2/2006 | Davidson et al. |
| 7,436,177 B2 | 10/2008 | Gorrell et al. | | 2006/0045418 A1 | 3/2006 | Cho et al. |
| 7,442,940 B2 | 10/2008 | Gorrell et al. | | 2006/0050269 A1 | 3/2006 | Brownell |
| 7,443,358 B2 | 10/2008 | Gorrell et al. | | 2006/0060782 A1 | 3/2006 | Khursheed |
| 7,470,920 B2 | 12/2008 | Gorrell et al. | | 2006/0062258 A1 | 3/2006 | Brau et al. |
| 7,473,917 B2 | 1/2009 | Singh | | 2006/0131176 A1 | 6/2006 | Hsu |
| 2001/0025925 A1 | 10/2001 | Abe et al. | | 2006/0131695 A1 | 6/2006 | Kuekes et al. |
| 2002/0009723 A1 | 1/2002 | Hefti | | 2006/0159131 A1 | 7/2006 | Liu et al. |
| 2002/0027481 A1 | 3/2002 | Fiedziuszko | | 2006/0164496 A1 | 7/2006 | Tokutake et al. |
| 2002/0036121 A1 | 3/2002 | Ball et al. | | 2006/0187794 A1 | 8/2006 | Harvey et al. |
| 2002/0036264 A1 | 3/2002 | Nakasuji et al. | | 2006/0208667 A1 | 9/2006 | Lys et al. |
| 2002/0053638 A1 | 5/2002 | Winkler et al. | | 2006/0216940 A1 | 9/2006 | Gorrell et al. |
| 2002/0068018 A1 | 6/2002 | Pepper et al. | | 2006/0243925 A1 | 11/2006 | Barker et al. |
| 2002/0070671 A1 | 6/2002 | Small | | 2006/0274922 A1 | 12/2006 | Ragsdale |
| 2002/0071457 A1 | 6/2002 | Hogan | | 2006/0285799 A1* | 12/2006 | Spillane et al. ............... 385/50 |
| 2002/0122531 A1 | 9/2002 | Whitham | | 2007/0003781 A1 | 1/2007 | de Rochemont |
| 2002/0135665 A1 | 9/2002 | Gardner | | 2007/0013765 A1 | 1/2007 | Hudson et al. |
| 2002/0139961 A1 | 10/2002 | Kinoshita et al. | | 2007/0075263 A1 | 4/2007 | Gorrell et al. |
| 2002/0158295 A1 | 10/2002 | Armgarth et al. | | 2007/0075264 A1 | 4/2007 | Gorrell et al. |
| 2002/0191650 A1 | 12/2002 | Madey et al. | | 2007/0085039 A1 | 4/2007 | Gorrell et al. |
| 2003/0010979 A1 | 1/2003 | Pardo | | 2007/0086915 A1 | 4/2007 | LeBoeuf et al. |
| 2003/0012925 A1 | 1/2003 | Gorrell | | 2007/0116420 A1 | 5/2007 | Estes et al. |
| 2003/0016412 A1 | 1/2003 | Small | | 2007/0146704 A1 | 6/2007 | Schmidt et al. |
| 2003/0016421 A1 | 1/2003 | Small | | 2007/0152176 A1 | 7/2007 | Gorrell et al. |
| 2003/0034535 A1 | 2/2003 | Barenburu et al. | | 2007/0154846 A1 | 7/2007 | Gorrell et al. |
| 2003/0103150 A1 | 6/2003 | Catrysse et al. | | 2007/0194357 A1 | 8/2007 | Oohashi |
| 2003/0106998 A1 | 6/2003 | Colbert et al. | | 2007/0200940 A1 | 8/2007 | Gruhlke et al. |
| 2003/0155521 A1 | 8/2003 | Feuerbaum | | 2007/0252983 A1 | 11/2007 | Tong et al. |
| 2003/0158474 A1 | 8/2003 | Scherer et al. | | 2007/0258492 A1 | 11/2007 | Gorrell |
| 2003/0164947 A1 | 9/2003 | Vaupel | | 2007/0258689 A1* | 11/2007 | Gorrell et al. ............... 385/130 |
| 2003/0179974 A1 | 9/2003 | Estes et al. | | 2007/0258690 A1 | 11/2007 | Gorrell et al. |
| 2003/0206708 A1 | 11/2003 | Estes et al. | | 2007/0259641 A1 | 11/2007 | Gorrell |
| 2003/0214695 A1 | 11/2003 | Abramson et al. | | 2007/0264023 A1 | 11/2007 | Gorrell et al. |
| 2004/0061053 A1 | 4/2004 | Taniguchi et al. | | 2007/0264030 A1 | 11/2007 | Gorrell et al. |
| 2004/0080285 A1 | 4/2004 | Victor et al. | | 2007/0284527 A1 | 12/2007 | Zani et al. |

| | | |
|---|---|---|
| 2008/0069509 A1* | 3/2008 | Gorrell et al. ............... 385/129 |
| 2008/0302963 A1 | 12/2008 | Nakasuji et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

U.S. Appl. No. 11/418,082, filed May 5, 2006, Gorrell et al.
J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Search Report and Written Opinion mailed Aug. 24, 2007 in PCT Appln. No. PCT/US2006/022768.
Search Report and Written Opinion mailed Aug. 31, 2007 in PCT Appln. No. PCT/US2006/022680.
Search Report and Written Opinion mailed Jul. 16, 2007 in PCT Appln. No. PCT/US2006/022774.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776.
Search Report and Written Opinion mailed Jun. 20, 2007 in PCT Appln. No. PCT/US2006/022779.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.
Search Report and Written Opinion mailed Sep. 17, 2007 in PCT Appln. No. PCT/US2006/022689.
International Search Report and Written Opinion mailed Nov. 23, 2007 in International Application No. PCT/US2006/022786.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.
Search Report and Written Opinion mailed Sep. 21, 2007 in PCT Appln. No. PCT/US2006/022688.
Search Report and Written Opinion mailed Sep. 25, 2007 in PCT appln. No. PCT/US2006/022681.
Search Report and Written Opinion mailed Sep. 26, 2007 in PCT Appln. No. PCT/US2006/024218.
"Notice of Allowability" mailed on Jan. 17, 2008 in U.S. Appl. No. 11/418,082, filed May 5, 2006.
Search Report and Written Opinion mailed Apr. 23, 2008 in PCT Appln. No. PCT/US2006/022678.
Search Report and Written Opinion mailed Apr. 3, 2008 in PCT Appln. No. PCT/US2006/027429.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appln. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.
Mar. 6, 2009 Response to PTO Office Action of Sep. 16, 2008 in U.S. Appl. No. 11/418,085.
Mar. 17, 2008 PTO Office Action in U.S. Appl. No. 11/353,208.
Mar. 19, 2009 PTO Office Action in U.S. Appl. No. 11/411,120.
Mar. 24, 2006 PTO Office Action in U.S. Appl. No. 10/917,511.
Mar. 25, 2008 PTO Office Action in U.S. Appl. No. 11/411,131.
Mar. 31, 2008 PTO Office Action in U.S. Appl. No. 11/418,315.
Apr. 8, 2008 PTO Office Action in U.S. Appl. No. 11/325,571.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 11, 2008 PTO Office Action in U.S. Appl. No. 11/325,534.
Jun. 16, 2008 Response to PTO Office Action of Dec. 14, 2007 in U.S. Appl. No. 11/418,264.
Jun. 20, 2008 PTO Office Action in U.S. Appl. No. 11/418,083.
Jun. 20, 2008 Response to PTO Office Action of Mar. 25, 2008 in U.S. Appl. No. 11/411,131.
Jul. 1, 2008 PTO Office Action in U.S. Appl. No. 11/418,244.
Aug. 10, 2007 PTO Office Action in U.S. Appl. No. 11/418,085.
Aug. 12, 2008 Response to PTO Office Action of Feb. 12, 2008 in U.S. Appl. No. 11/418,085.
Aug. 14, 2006 PTO Office Action in U.S. Appl. No. 10/917,511.
Sep. 1, 2006 Response to PTO Office Action of Aug. 14, 2006 in U.S. Appl. No. 10/917,511.
Sep. 12, 2005 Response to PTO Office Action of May 10, 2005 in U.S. Appl. No. 10/917,511.
Sep. 14, 2007 PTO Office Action in U.S. Appl. No. 11/411,131.
Sep. 15, 2008 Response to PTO Office Action of Mar. 17, 2008 in U.S. Appl. No. 11/353,208.
Sep. 16, 2008 PTO Office Action in U.S. Appl. No. 11/418,085.
Oct. 15, 2008 Response to PTO Office Action of Jun. 11, 2008 in U.S. Appl. No. 11/325,534.
Oct. 19, 2007 Response to PTO Office Action of May 21, 2007 in U.S. Appl. No. 11/418,087.
Nov. 13, 2007 Response to PTO Office Action of Aug. 10, 2007 in U.S. Appl. No. 11/418,085.
Nov. 25, 2008 Response to PTO Office Action of Jul. 1, 2008 in U.S. Appl. No. 11/418,244.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 18, 2008 Response to PTO Office Action of Jun. 20, 2008 in U.S. Appl. No. 11/418,083.
Dec. 20, 2007 PTO Office Action in U.S. Appl. No. 11/418,087.
Dec. 24, 2008 PTO Office Action in U.S. Appl. No. 11/353,208.
European Search Report mailed Mar. 3, 2009 in European Application No. 06852028.7.
U.S. Appl. No. 11/203,407, filed Nov. 13, 2008 PTO Office Action.
U.S. Appl. No. 11/238,991, filed Dec. 6, 2006 PTO Office Action.
U.S. Appl. No. 11/238,991, filed Jun. 6, 2007 Response to PTO Office Action of Dec. 6, 2006.
U.S. Appl. No. 11/238,991, filed Sep. 10, 2007 PTO Office Action.
U.S. Appl. No. 11/238,991, filed Mar. 6, 2008 Response to PTO Office Action of Sep. 10, 2007.
U.S. Appl. No. 11/238,991, filed Jun. 27, 2008 PTO Office Action.

U.S. Appl. No. 11/238,991, filed Dec. 29, 2008 Response to PTO Office Action of Jun. 27, 2008.
U.S. Appl. No. 11/238,991, filed Mar. 24, 2009 PTO Office Action.
U.S. Appl. No. 11/243,477, filed Apr. 25, 2008 PTO Office Action.
U.S. Appl. No. 11/243,477, filed Oct. 24, 2008 Response to PTO Office Action of Apr. 25, 2008.
U.S. Appl. No. 11/243,477, filed Jan. 7, 2009 PTO Office Action.
U.S. Appl. No. 11/325,448, filed Jun. 16, 2008 PTO Office Action.
U.S. Appl. No. 11/325,448, filed Dec. 16, 2008 Response to PTO Office Action of Jun. 16, 2008.
U.S. Appl. No. 11/353,208, filed Jan. 15, 2008 PTO Office Action.
U.S. Appl. No. 11/353,208, filed Dec. 30, 2008 Response to PTO Office Action of Dec. 24, 2008.
U.S. Appl. No. 11/400,280, filed Oct. 16, 2008 PTO Office Action.
U.S. Appl. No. 11/400,280, filed Oct. 24, 2008 Response to PTO Office Action of Oct. 16, 2008.
U.S. Appl. No. 11/410,924, filed Mar. 6, 2009 PTO Office Action.
U.S. Appl. No. 11/411,129, filed Jan. 16, 2009 Office Action.
U.S. Appl. No. 11/411,130, filed May 1, 2008 PTO Office Action.
U.S. Appl. No. 11/411,130, filed Oct. 29, 2008 Response to PTO Office Action of May 1, 2008.
U.S. Appl. No. 11/417,129, filed Jul. 11, 2007 PTO Office Action.
U.S. Appl. No. 11/417,129, filed Dec. 17, 2007 Response to PTO Office Action of Jul. 11, 2007.
U.S. Appl. No. 11/417,129, filed Dec. 20, 2007 Response to PTO Office Action of Jul. 11, 2007.
U.S. Appl. No. 11/417,129, filed Apr. 17, 2008 PTO Office Action.
U.S. Appl. No. 11/417,129, filed Jun. 19, 2008 Response to PTO Office Action of Apr. 17, 2008.
U.S. Appl. No. 11/418,079, filed Apr. 11, 2008 PTO Office Action.
U.S. Appl. No. 11/418,079, filed Oct. 7, 2008 Response to PTO Office Action of Apr. 11, 2008.
U.S. Appl. No. 11/418,079, filed Feb. 12, 2009 PTO Office Action.
U.S. Appl. No. 11/418,080, filed Mar. 18, 2009 PTO Office Action.
U.S. Appl. No. 11/418,082, filed Jan. 17, 2007 PTO Office Action.
U.S. Appl. No. 11/418,084, filed Nov. 5, 2007 PTO Office Action.
U.S. Appl. No. 11/418,084, filed May 5, 2008 Response to PTO Office Action of Nov. 5, 2007.
U.S. Appl. No. 11/418,084, filed Aug. 19, 2008 PTO Office Action.
U.S. Appl. No. 11/418,084, filed Feb. 19, 2009 Response to PTO Office Action of Aug. 19, 2008.
U.S. Appl. No. 11/418,085, filed Feb. 12, 2008 PTO Office Action.
U.S. Appl. No. 11/418,087, filed Dec. 29, 2006 Response to PTO Office Action of Dec. 4, 2006.
U.S. Appl. No. 11/418,087, filed Feb. 15, 2007 PTO Office Action.
U.S. Appl. No. 11/418,087, filed Mar. 6, 2007 Response to PTO Office Action of Feb. 15, 2007.
U.S. Appl. No. 11/418,088, filed Jun. 9, 2008 PTO Office Action.
U.S. Appl. No. 11/418,088, filed Dec. 8, 2008 Response to PTO Office Action of Jun. 9, 2008.
U.S. Appl. No. 11/418,089, filed Mar. 21, 2008 PTO Office Action.
U.S. Appl. No. 11/418,089, filed Jun. 23, 2008 Response to PTO Office Action of Mar. 21, 2008.
U.S. Appl. No. 11/418,089, filed Sep. 30, 2008 PTO Office Action.
U.S. Appl. No. 11/418,089, filed Mar. 30, 2009 Response to PTO Office Action of Sep. 30, 2008.
U.S. Appl. No. 11/418,091, filed Jul. 30, 2007 PTO Office Action.
U.S. Appl. No. 11/418,091, filed Nov. 27, 2007 Response to PTO Office Action of Jul. 30, 2007.
U.S. Appl. No. 11/418,091, filed Feb. 26, 2008 PTO Office Action.
U.S. Appl. No. 11/418,097, filed Jun. 2, 2008 PTO Office Action.
U.S. Appl. No. 11/418,097, filed Dec. 2, 2008 Response to PTO Office Action of Jun. 2, 2008.
U.S. Appl. No. 11/418,097, filed Feb. 18, 2009 PTO Office Action.
U.S. Appl. No. 11/418,099, filed Jun. 23, 2008 PTO Office Action.
U.S. Appl. No. 11/418,099, filed Dec. 23, 2008 Response to PTO Office Action of Jun. 23, 2008.
U.S. Appl. No. 11/418,100, filed Jan. 12, 2009 PTO Office Action.
U.S. Appl. No. 11/418,123, filed Apr. 25, 2008 PTO Office Action.
U.S. Appl. No. 11/418,123, filed Oct. 27, 2008 Response to PTO Office Action of Apr. 25, 2008.
U.S. Appl. No. 11/418,123, filed Jan. 26, 2009 PTO Office Action.
U.S. Appl. No. 11/418,124, filed Oct. 1, 2008 PTO Office Action.
U.S. Appl. No. 11/418,124, filed Feb. 2, 2009 Response to PTO Office Action of Oct. 1, 2008.
U.S. Appl. No. 11/418,124, filed Mar. 13, 2009 PTO Office Action.
U.S. Appl. No. 11/418,126, filed Oct. 12, 2006 PTO Office Action.
U.S. Appl. No. 11/418,126, filed Feb. 12, 2007 Response to PTO Office Action of Oct. 12, 2006 (Redacted).
U.S. Appl. No. 11/418,126, filed Jun. 6, 2007 PTO Office Action.
U.S. Appl. No. 11/418,126, filed Aug. 6, 2007 Response to PTO Office Action of Jun. 6, 2007.
U.S. Appl. No. 11/418,126, filed Nov. 2, 2007 PTO Office Action.
U.S. Appl. No. 11/418,126, filed Feb. 22, 2008 Response to PTO Office Action of Nov. 2, 2007.
U.S. Appl. No. 11/418,126, filed Jun. 10, 2008 PTO Office Action.
U.S. Appl. No. 11/418,127, filed Apr. 2, 2009 Office Action.
U.S. Appl. No. 11/418,128, filed Dec. 16, 2008 PTO Office Action.
U.S. Appl. No. 11/418,128, filed Dec. 31, 2008 Response to PTO Office Action of Dec. 16, 2008.
U.S. Appl. No. 11/418,128, filed Feb. 17, 2009 PTO Office Action.
U.S. Appl. No. 11/418,129, filed Dec. 16, 2008 PTO Office Action.
U.S. Appl. No. 11/418,129, filed Dec. 31, 2008 Response to PTO Office Action of Dec. 16, 2008.
U.S. Appl. No. 11/418,263, filed Sep. 24, 2008 PTO Office Action.
U.S. Appl. No. 11/418,263, filed Dec. 24, 2008 Response to PTO Office Action of Sep. 24, 2008.
U.S. Appl. No. 11/418,263, filed Mar. 9, 2009 PTO Office Action.
U.S. Appl. No. 11/418,318, filed Mar. 31, 2009 PTO Office Action.
U.S. Appl. No. 11/441,219, filed Jan. 7, 2009 PTO Office Action.
U.S. Appl. No. 11/522,929, filed Oct. 22, 2007 PTO Office Action.
U.S. Appl. No. 11/522,929, filed Feb. 21, 2008 Response to PTO Office Action of Oct. 22, 2007.
U.S. Appl. No. 11/641,678, filed Jul. 22, 2008 PTO Office Action.
U.S. Appl. No. 11/641,678, filed Jan. 22, 2009 Response to Office Action of Jul. 22, 2008.
U.S. Appl. No. 11/711,000, filed Mar. 6, 2009 PTO Office Action.
U.S. Appl. No. 11/716,552, filed Feb. 12, 2009 Response to PTO Office Action of Feb. 9, 2009.
U.S. Appl. No. 11/716,552, filed Jul. 3, 2008 PTO Office Action.
Response to Non-Final Office Action submitted May 13, 2009 in U.S. Appl. No. 11/203,407.
U.S. Appl. No. 11/238,991, filed May 11, 2009 PTO Office Action.
U.S. Appl. No. 11/350,812, filed Apr. 17, 2009 Office Action.
"Array of Nanoklystrons for Frequency Agility or Redundancy," NASA's Jet Propulsion Laboratory, NASA Tech Briefs, NPO-21033. 2001.
"Antenna Arrays." May 18, 2002. www.tpub.com/content/neets/14183/css/14183_159.htm.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.

Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.

Chuang, S.L. et al., "Smith-Purcell Radiation from a Charge Moving Above a Penetrable Grating," IEEE MTT-S Digest, 1983, pp. 405-406, IEEE.

Far-IR, Sub-MM & MM Detector Technology Workshop list of manuscripts, session 6 2002.

Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.

Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.

Gallerano, G.P. et al., "Overview of Terahertz Radiation Sources," Proceedings of the 2004 FEL Conference, pp. 216-221.

Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.

Gover, A. et al., "Angular Radiation Pattern of Smith-Purcell Radiation," Journal of the Optical Society of America, Oct. 1984, pp. 723-728, vol. 1 No. 5, Optical Society of America.

Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.

Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.

Ives, Lawrence et al., "Development of Backward Wave Oscillators for Terahertz Applications," Terahertz for Military and Security Applications, Proceedings of SPIE vol. 5070 (2003), pp. 71-82.

Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA, Nov. 1995 pp. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17(5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Phototonics Research, "Surface-Plasmon-Enhanced Random Laser Demonstrated," Photonics Spectra, Feb. 2005, pp. 112-113.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 μm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.

Markoff, John, "A Chip That Can Transfer Data Using Laser Light," The New York Times, Sep. 18, 2006.

S.M. Sze, "Semiconductor Devices Physics and Technology", 2nd Edition, Chapters 9 and 12, Copyright 1985, 2002.

Search Report and Written Opinion mailed Feb. 12, 2007 in PCT Appln. No. PCT/US2006/022682.

Search Report and Written Opinion mailed Feb. 20, 2007 in PCT Appln. No. PCT/US2006/022676.

Search Report and Written Opinion mailed Feb. 20, 2007 in PCT Appln. No. PCT/US2006/022772.

Search Report and Written Opinion mailed Feb. 20, 2007 in PCT Appln. No. PCT/US2006/022780.

Search Report and Written Opinion mailed Feb. 21, 2007 in PCT Appln. No. PCT/US2006/022684.

Search Report and Written Opinion mailed Jan. 17, 2007 in PCT Appln. No. PCT/US2006/022777.

Search Report and Written Opinion mailed Jan. 23, 2007 in PCT Appln. No. PCT/US2006/022781.

Search Report and Written Opinion mailed Mar. 7, 2007 in PCT Appln. No. PCT/US2006/022775.

Thurn-Albrecht et al., "Ultrahigh-Density Nanowire Arrays Grown in Self-Assembled Diblock Copolymer Templates", Science 290. 5499, Dec. 15, 2000, pp. 2126-2129.

Neo et al., "Smith-Purcell Radiation from Ultraviolet to Infrared Using a Si-field Emitter" Vacuum Electronics Conference, 2007, IVEC '07, IEEE International May 2007.

Search Report and Written Opinion mailed Jul. 14, 2008 in PCT Appln. No. PCT/US2006/022773.

Search Report and Written Opinion mailed Aug. 19, 2008 in PCT Appln. No. PCT/US2007/008363.

Search Report and Written Opinion mailed Jul. 16, 2008 in PCT Appln. No. PCT/US2006/022766.

Search Report and Written Opinion mailed Jul. 28, 2008 in PCT Appln. No. PCT/US2006/022782.

Search Report and Written Opinion mailed Jul. 3, 2008 in PCT Appln. No. PCT/US2006/022690.

Search Report and Written Opinion mailed Jul. 3, 2008 in PCT Appln. No. PCT/US2006/022778.

Search Report and Written Opinion mailed Jul. 7, 2008 in PCT Appln. No. PCT/US2006/022686.

Search Report and Written Opinion mailed Jul. 7, 2008 in PCT Appln. No. PCT/US2006/022785.

Search Report and Written Opinion mailed Sep. 2, 2008 in PCT Appln. No. PCT/US2006/022769.

Search Report and Written Opinion mailed Sep. 26, 2008 in PCT Appln. No. PCT/US2007/00053.

Search Report and Written Opinion mailed Sep. 3, 2008 in PCT Appln. No. PCT/US2006/022770.

"An Early History—Invention of the Klystron," http://varianinc.com/cgi-bin/advprint/print.cgi?cid=KLQNPPJJFJ, printed on Dec. 26, 2008.

"An Early History—The Founding of Varian Associates," http://varianinc.com/cgi-bin/advprint/print.cgi?cid=KLQNPPJJFJ, printed on Dec. 26, 2008.

"Chapter 3 E-Ray Tube," http://compepid.tuskegee.edu/syllabi/clinical/small/radiology/chapter..., printed from tuskegee.edu on Dec. 29, 2008.

"Diagnostic imaging modalities—Ionizing vs non-ionizing radiation," http://info.med.yale.edu/intmed/cardio/imaging/techniques/ionizing_v..., printed from Yale University School of Medicine on Dec. 29, 2008.

"Frequently Asked Questions," Luxtera Inc., found at http://www.luxtera.com/technology_faq.htm, printed on Dec. 2, 2005, 4 pages.

"Klystron Amplifier," http://www.radartutorial.eu/08.transmitters/tx12.en.html, printed on Dec. 26, 2008.

"Klystron is a Micowave Generator," http://www2.slac.stanford.edu/vvc/accelerators/klystron.html, printed on Dec. 26, 2008.

"Klystron," http:en.wikipedia.org/wiki/Klystron, printed on Dec. 26, 2008.

"Making E-rays," http://www.fnrfscience.cmu.ac.th/theory/radiation/xray-basics.html, printed on Dec. 29, 2008.

"Microwave Tubes," http://www.tpub.com/neets.book11/45b.htm, printed on Dec. 26, 2008.

"Technology Overview," Luxtera, Inc., found at http://www.luxtera.com/technology.htm, printed on Dec. 2, 2005, 1 page.

"The Reflex Klystron," http://www.fnrfscience.cmu.ac.th/theory/microwave/microwave%2, printed from Fast Netoron Research Facilty on Dec. 26, 2008.

"x-ray tube," http://www.answers.com/topic/x-ray-tube, printed on Dec. 29, 2008.

Corcoran, Elizabeth, "Ride the Light," Forbes Magazine, Apr. 11, 2005, pp. 68-70.

Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.

Sartori, Gabriele, "CMOS Photonics Platform," Luxtera, Inc., Nov. 2005, 19 pages.

* cited by examiner

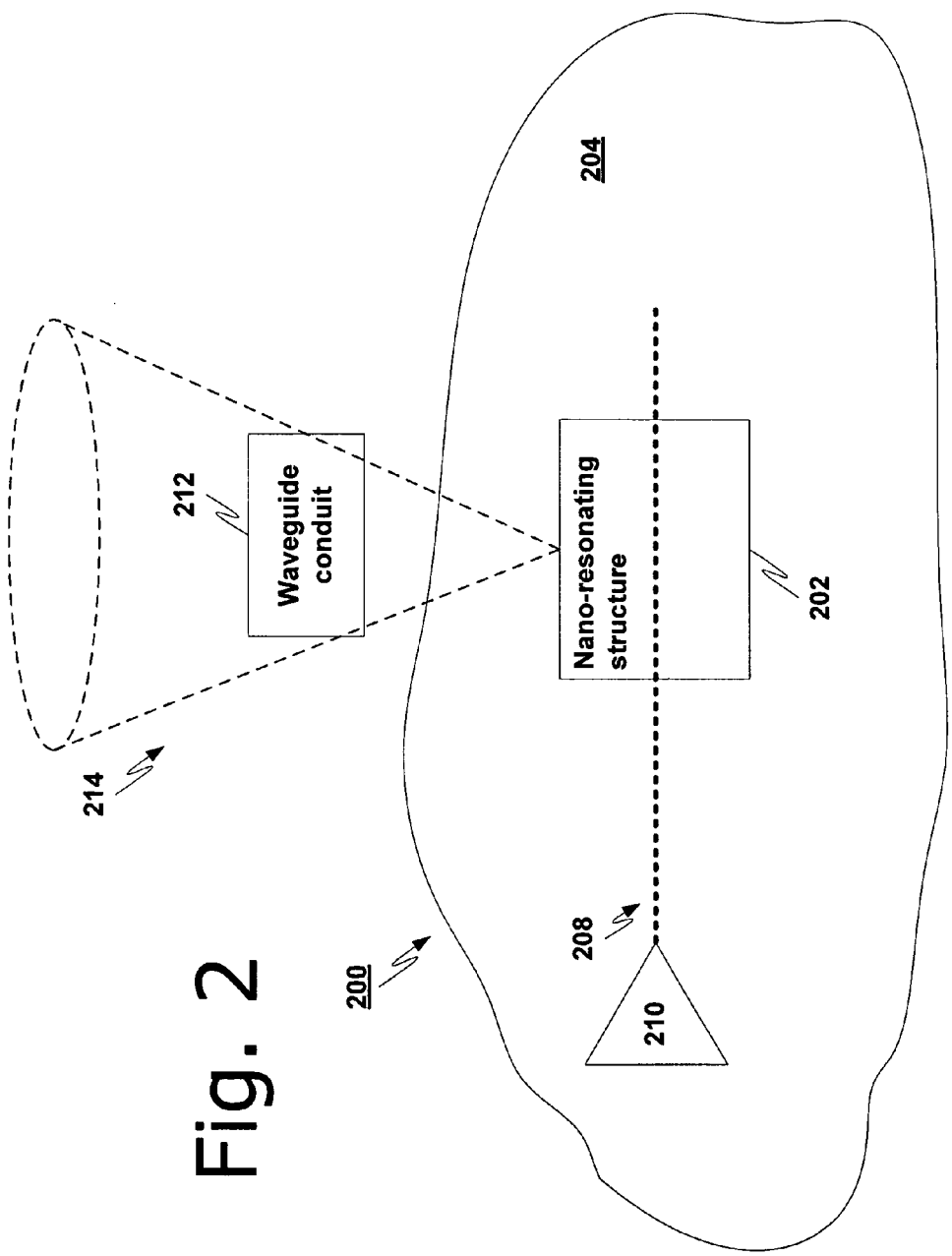

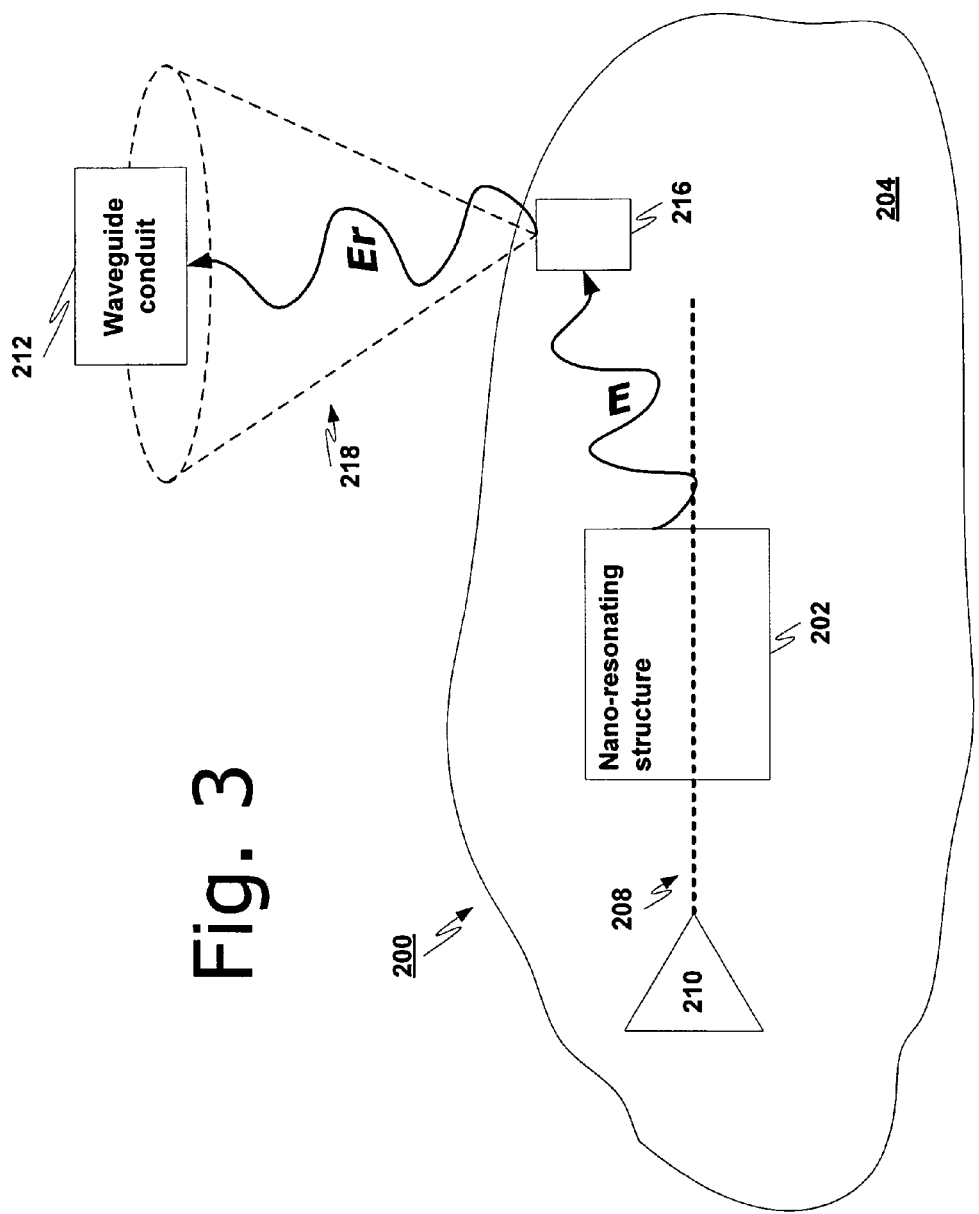

COUPLING LIGHT OF LIGHT EMITTING RESONATOR TO WAVEGUIDE

CROSS-REFERENCE TO CO-PENDING APPLICATIONS

The present invention is related to and claims priority from U.S. application Ser. No. 11/302,471, entitled "Coupled Nano-Resonating Energy Emitting Structures," filed Dec. 14, 2005, the entire contents of which is incorporated herein by reference.

The present invention is related to the following co-pending U.S. patent applications, which are all commonly owned with the present application, the entire contents of each of which are incorporated herein by reference:

(1) U.S. patent application Ser. No. 11/238,991, filed Sep. 30, 2005, entitled "Ultra-Small Resonating Charged Particle Beam Modulator";

(2) U.S. patent application Ser. No. 10/917,511, filed on Aug. 13, 2004, entitled "Patterning Thin Metal Film by Dry Reactive Ion Etching";

(3) U.S. application Ser. No. 11/203,407, filed on Aug. 15, 2005, entitled "Method Of Patterning Ultra-Small Structures";

(4) U.S. application Ser. No. 11/243,476, filed on Oct. 5, 2005, entitled "Structures And Methods For Coupling Energy From An Electromagnetic Wave";

(5) U.S. application Ser. No. 11/243,477, filed on Oct. 5, 2005, entitled "Electron beam induced resonance";

(6) U.S. application Ser. No. 11/325,448, entitled "Selectable Frequency Light Emitter from Single Metal Layer," filed Jan. 5, 2006;

(7) U.S. application Ser. No. 11/325,432, entitled "Matrix Array Display," filed Jan. 5, 2006;

(8) U.S. application Ser. No. 11/410,924, entitled "Selectable Frequency EMR Emitter," filed Apr. 26, 2006; and (9) U.S. application Ser. No. 11/349,963, filed Feb. 9, 2006, entitled "Method And Structure For Coupling Two Microcircuits,".

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This relates to electromagnetic radiation devices, and, more particularly, to coupling output from light-emitting structures.

INTRODUCTION

Various light-emitting resonator structures have been disclosed, e.g., in the related applications listed above. For example, U.S. application Ser. No. 11/410,924, entitled, "Selectable Frequency EMR Emitter," filed Apr. 26, 2006, which has been fully incorporated herein by reference, describes various optical transmitters including, in some embodiments, an optical switch using plural resonant structures emitting electromagnetic radiation resonant (EMR), where the resonant structures are excited by a charged particle source such as an electron beam.

It is desirable to couple such produced EMR into a waveguide, thereby allowing the light to be directed along a specific path.

BRIEF DESCRIPTION OF THE DRAWINGS

The following description, given with respect to the attached drawings, may be better understood with reference to the non-limiting examples of the drawings, wherein:

FIGS. 1-3 show structures for coupling emitted light, according to embodiments of the present invention.

THE PRESENTLY PREFERRED EXEMPLARY EMBODIMENTS

Figure 1:
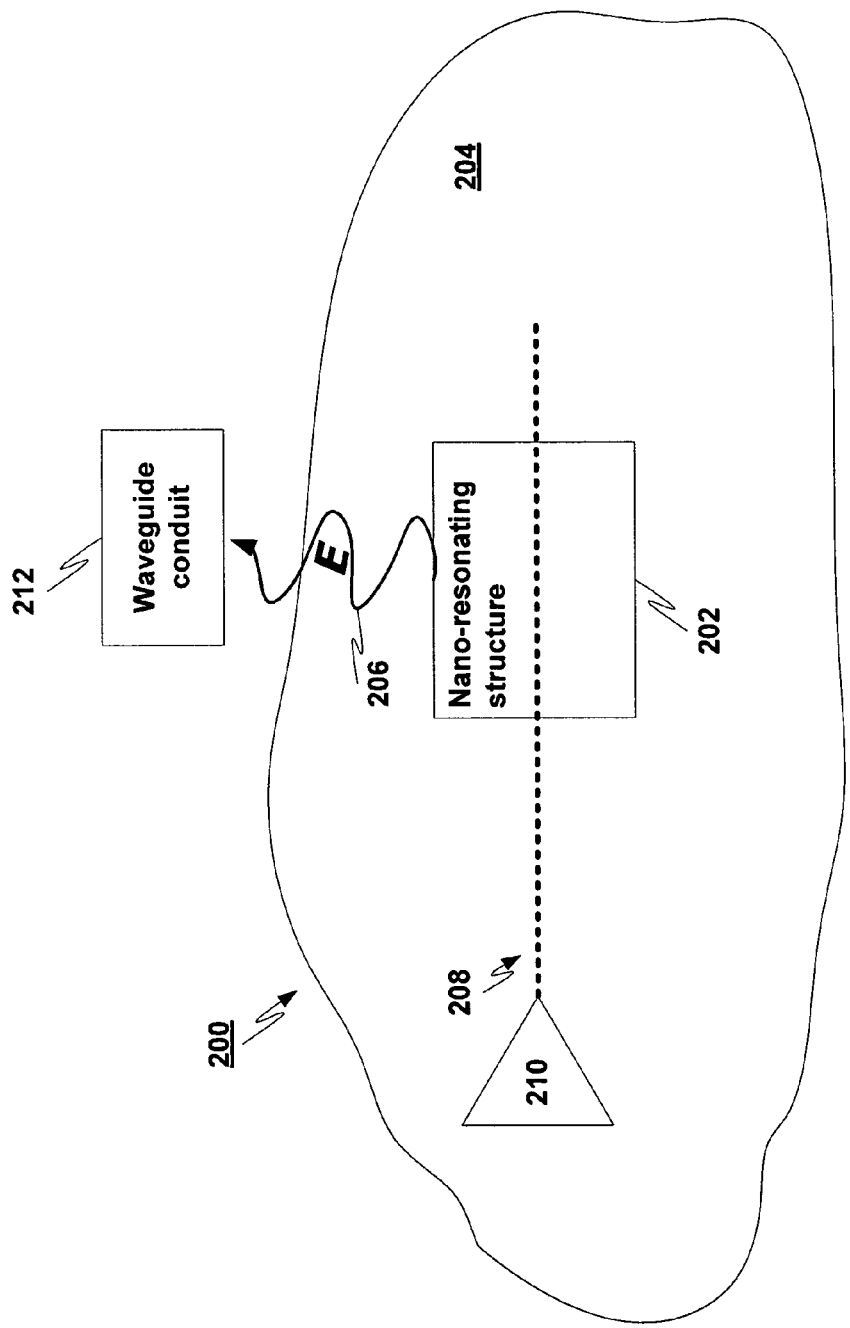

Various exemplary EMR-emitting micro-resonant structures have been described in the related applications. For example, U.S. application Ser. No. 11/410,924, (described more fully above, and incorporated herein by reference) entitled, "Selectable Frequency EMR Emitter," describes various exemplary light-emitting micro-resonant structures. The structures disclosed therein can emit light (such as infrared light, visible light or ultraviolet light or any other electromagnetic radiation (EMR) at a wide range of possible frequencies, and often at a frequency higher than that of microwave). The EMR is emitted when the resonant structure is exposed to a beam of charged particles ejected from or emitted by a source of charged particles. The source may be controlled by applying a signal on a data input. The charged particle beam can include ions (positive or negative), electrons, protons and the like. The beam may be produced by any source, including, e.g., without limitation an ion gun, a thermionic filament, a tungsten filament, a cathode, a field-emission cathode, a planar vacuum triode, an electron-impact ionizer, a laser ionizer, a chemical ionizer, a thermal ionizer, an ion-impact ionizer and the like.

It is sometimes desirable to couple the emitted light so as to direct it to some other location. For example, a communications medium (e.g., a fiber optic cable) may be provided in close proximity to the resonant structures such that light emitted from the resonant structures is directed in the direction of a receiver, as is illustrated, e.g., in FIG. 21 of U.S. application Ser. No. 11/410,924.

FIG. 1 shows a typical light-emitting device 200 according to embodiments of the present invention. The device 200 includes at least one element 202 formed on a substrate 204 (such as a semiconductor substrate or a circuit board). The element 202 is made up of at least one resonant structure that emits light (such as infrared light, visible light or ultraviolet light or any other electromagnetic radiation (EMR) 206 at a wide range of possible frequencies, and often at a frequency higher than that of microwave). The EMR 206 is emitted when the resonant structure is exposed to a beam 208 of charged particles ejected from or emitted by a source of charged particles 210. The charged particle beam can include ions (positive or negative), electrons, protons and the like. The beam may be produced by any source, including, e.g., without limitation an ion gun, a tungsten filament, a cathode, a planar vacuum triode, an electron-impact ionizer, a laser ionizer, a chemical ionizer, a thermal ionizer, an ion-impact ionizer.

The devices described produce electromagnetic radiation by the excitation of ultra-small resonant structures. The resonant excitation in the device described is induced by electromagnetic interaction which is caused, e.g., by the passing of a charged particle beam in close proximity to the device.

Such a device as represented in FIG. 1 may be made, e.g., using techniques such as described in U.S. patent application Ser. No. 10/917,511, entitled "Patterning Thin Metal Film by Dry Reactive Ion Etching" and/or U.S. application Ser. No. 11/203,407, entitled "Method Of Patterning Ultra-Small Structures," both of which have been incorporated herein by reference. The element 202 may comprise any number of resonant microstructures constructed and adapted to produce EMR, e.g., as described above and/or in U.S. application Ser. No. 11/325,448, entitled "Selectable Frequency Light Emitter from Single Metal Layer," filed Jan. 5, 2006, U.S. application Ser. No. 11/325,432, entitled, "Matrix Array Display," filed Jan. 5, 2006, and U.S. application Ser. No. 11/243,476, filed on Oct. 5, 2005, entitled "Structures And Methods For Coupling Energy From An Electromagnetic Wave"; U.S. application Ser. No. 11/243,477, filed on Oct. 5, 2005, entitled "Electron beam induced resonance;" and U.S. application Ser. No. 11/302,471, entitled "Coupled Nano-Resonating Energy Emitting Structures," filed Dec. 14, 2005.

The electromagnetic radiation produced by the nano-resonating structure 202 may be coupled to an electro-magnetic wave via a waveguide conduit 212 positioned in the proximity of nano-resonating structure 202. The waveguide conduit may be, for example, an optical fiber or the like.

The actual positioning of a particular waveguide conduit will depend, at least in part, on the form and type particular nano-resonating structure 202. Different structures will emit light at different angles relative to the surface of the substrate 204, and relative to the various components of the structure 202. In general, as shown, e.g., in FIG. 2, light is emitted in a conical volume 214, and the waveguide conduit 212 should be positioned within that volume, preferably centered within that volume.

In some cases it may be difficult to position the waveguide conduit 212 in an optimal or even suitable location. For example, depending on the structure 202, the angle of the emitted light relative to the surface of the substrate 204 and/or the angle of the conical region may make positioning of the waveguide conduit difficult or even impossible. In such cases, additional reflective structure be provided, e.g., on the substrate, in order to direct the emitted light to the waveguide. In addition to reflecting the emitted light, the reflective structure may be used to narrow or widen the beam. For example, as shown in FIG. 3, a reflective structure 216 is positioned on the surface of the substrate 204 to redirect the emitted light E (as light Er) to the waveguide conduit. Note that the conical volume 218 may have a wider or narrower angle than that of the light emitted from the structure 202. Reflective structure 216 may comprise on or more reflective elements formed on the substrate 204 and/or in a package containing the substrate.

Those skilled in the art will immediately understand that more than one reflective structure 216 may be provided. Further, more than one nano-resonant structure 202 may emit light into the same reflective structure. In this manner, a single waveguide conduit may be provided for multiple nano-resonant structures.

It is preferable to position the waveguide conduit 212 to capture as much of the emitted light as possible.

In some embodiments of the present invention, the nano-resonating structure 202 and the waveguide conduit 212 may be integrated into a single microchip.

As used throughout this and the related applications, the word "light" (unless otherwise specifically limited) refers generally to any electromagnetic radiation (EMR) at a wide range of possible frequencies, regardless of whether it is visible to the human eye, including, e.g., infrared light, visible light or ultraviolet light.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A device comprising:
    at least one ultra-small resonant structure constructed and adapted to emit electromagnetic radiation (EMR) in response to excitation by a beam of charged particles passing in proximity to the at least one ultra-small resonant structure; and
    at least one waveguide conduit constructed and adapted to capture a portion of the EMR emitted by the at least one ultra-small resonant structure.

2. A device as in claim 1 further comprising:
    a source of charged particles.

3. A device as in claim 2 wherein the source of charged particles is selected from the group comprising:
    an ion gun, a thermionic filament, a tungsten filament, a cathode, a field-emission cathode, a planar vacuum triode, an electron-impact ionizer, a laser ionizer, a chemical ionizer, a thermal ionizer, and an ion-impact ionizer.

4. A device as in claim 1 wherein the charged particles are selected from the group comprising: positive ions, negative ions, electrons, and protons.

5. A device as in claim 1 wherein the at least on ultra-small resonant structure is constructed and adapted to emit visible light.

6. A device as in claim 1 wherein the at least on ultra-small resonant structure is constructed and adapted to emit infrared light.

7. A device comprising:
    at least one nano-resonant structure constructed and adapted to emit electromagnetic radiation (EMR) in response to excitation by a beam of charged particles; and
    at least one waveguide conduit constructed and adapted to capture a portion of the EMR emitted by the at least one nano-resonant structure,
    wherein the at least one nano-resonant structure is constructed and adapted to emit ultraviolet light.

8. A device as in claim 1 further comprising:
    at least one reflective element constructed and adapted to direct EMR emitted by the at least one ultra-small resonant structure to the at least one waveguide conduit.

9. A device as in claim 1 wherein the waveguide conduit comprises a fiber optic cable.

10. A device as in claim 1 formed on a single microchip.

11. A device comprising:
    a source of charged particles selected from the group comprising an ion gun, a thermionic filament, a tungsten filament, a cathode, a field-emission cathode, a planar vacuum triode, an electron-impact ionizer, a laser ionizer, a chemical ionizer, a thermal ionizer, and an ion-impact ionizer;
    at least one ultra-small resonant structure constructed and adapted to emit light in response to excitation by a beam of charged particles passing in proximity to the at least one ultra-small resonant structure; and at least one waveguide conduit constructed and adapted to capture the light emitted by the at least one ultra-small resonant structure, wherein the waveguide conduit comprises a fiber optic cable.

12. A method comprising:

providing a source of charged particles;

providing at least one ultra-small resonant structure constructed and adapted to emit electromagnetic radiation (EMR) in response to excitation by the beam of charged particles passing in proximity to the at least one ultra-small resonant structure; and capturing at least a portion of of the EMR emitted by the at least one ultra-small resonant structure.

13. A method as in claim 12 wherein the source of charged particles is selected from the group comprising:

an ion gun, a thermionic filament, a tungsten filament, a cathode, a field-emission cathode, a planar vacuum triode, an electron-impact ionizer, a laser ionizer, a chemical ionizer, a thermal ionizer, and an ion-impact ionizer.

14. A method as in claim 12 wherein the charged particles are selected from the group comprising: positive ions, negative ions, electrons, and protons.

15. A method as in claim 12 wherein the EMR comprises one or more of: visible light; infrared light; and ultraviolet light.

16. A method as in claim 12 further comprising:

redirecting EMR emitted by the at least one ultra-small resonant structure to at least one waveguide conduit.

17. A method as in claim 16 wherein the waveguide conduit comprises a fiber optic cable.

18. A method as in claim 16 wherein the at least one waveguide conduit and the at least one ultra-small resonant structure are formed on the same chip.

19. A device as in claim 1, wherein the at least on ultra-small resonant structure is constructed and adapted to emit ultraviolet light.

20. A device as in claim 1, wherein the at least one ultra-small resonant structure comprises a series of resonating fingers separated by a period smaller than a wavelength of the EMR emitted by the at least one ultra-small resonant structure.

21. A device as in claim 20, wherein the series of resonating fingers separated by a period smaller than a wavelength of the EMR emitted by the at least one ultra-small resonant structure comprise metal fingers.

22. A device as in claim 11, wherein the at least one ultra-small resonant structure comprises a series of resonating fingers separated by a period smaller than a wavelength of the EMR emitted by the at least one ultra-small resonant structure.

23. A device as in claim 22, wherein the series of resonating fingers separated by a period smaller than a wavelength of the EMR emitted by the at least one ultra-small resonant structure comprise metal fingers.

* * * * *